Patented Jan. 22, 1952

2,582,949

UNITED STATES PATENT OFFICE 2,582,949

WATER-SOLUBLE COMBINATION PRODUCTS OF GOSSYPOL AND AMINO ACIDS

Aaron M. Altschul and Leah E. Castillon, New Orleans, La., assignors to the United States of America as represented by the Secretary of Agriculture No Drawing. Application May 18, 1951,
Serial No. 227,095

8 Claims. (Cl. 260—534)

(Granted under the act of March 3, 1883, as amended April 30, 1928; 370 O. G. 757)

The invention herein described may be manufactured and used by or for the Government of the United States of America for governmental purposes throughout the world, without the payment to us of any royalty thereon.

This invention relates to the preparation of non-toxic water-soluble products of gossypol by combination with materials of natural origin.

This application is copending with our applications Ser. Nos. 173,220, filed July 11, 1950, issued as Patent No. 2,563,808, and 173,221 filed July 11, 1950, and is a continuation in part of our application 173,219 filed July 11, 1950, now abandoned.

Gossypol is a naturally occurring pigment of cottonseed which is present to the extent of 0.5 to 1.5 percent by weight of the kernels. This pigment is concentrated in the pigment glands of the cottonseed and comprises 35 to 50 percent of the weight of these glands. Certain solvents such as petroleum naphthas or chlorinated hydrocarbons can be used to extract the oil from flaked cottonseed kernels without materially affecting the pigment glands or removing substantial quantities of their contents. Other solvents such as alcohols, ethers, and ketones rupture the pigment glands and extract their contents with the oil present in the seed.

It has been found that oil-free cottonseed meals containing intact pigment glands are toxic when fed in certain specific amounts to certain animals such as chicks and pigs. When, however, the pigment gland contents are removed along with the oil, the resulting meal gives no evidence of any physiological toxic effects. It has been established that intact pigment glands of cottonseed are toxic to animals and considerable experimental evidence suggests that one of the principal factors contributing to the toxicity of pigment glands is the gossypol contained therein.

In the normal practice of processing cottonseed for oil and meal by the hydraulic- or continuous screw-press methods, in which heat and pressure are applied to flaked or rolled cottonseed meats, the pigment glands are ruptured and their contents react with the surrounding extraglandular materials. Whereas in raw cottonseed meats, the amount of free gossypol, that is gossypol which is readily extractable by aqueous acetone or chloroform, varies from 0.5 to 1.5 percent, very little free gossypol can be detected in hydraulic or screw-press meal. In some of the newly developed methods of processing by solvent extraction of the oil, the cottonseed meats are cooked prior to extraction in order to facilitate extraction and the oil-free flakes are cooked after extraction to detoxify them. Gossypol is also destroyed by these processes and generally cannot be detected in the oil-free meals.

If, however, the oil is extracted without application of heat by solvents which do not cause the rupture of the pigment glands or by the new method of fractionation whereby the pigment glands are separated intact from the oil and meal (application of Boatner, Hall, and Merrifield, Serial No. 675,118, filed June 7, 1946, now Patent No. 2,482,141), the gossypol remains unchanged. By use of the solvent extraction method, the gossypol is found in the oil-free meal and in the gland fractionation process, in the separated pigment glands. In either case gossypol can be recovered from the meal or pigment glands by extraction with a suitable solvent such as aqueous acetone and can be purified to yield pure crystalline material.

Gossypol is a new by-product of processing cottonseed and can materially increase the value of cottonseed to the farmer and processor. It has been suggested that gossypol may have pharmaceutical uses and may be used as an insecticide. Biological research with this material and its application to new uses is difficult, however, because of its insolubility in water.

We have found that gossypol may be combined with amino acids to form new combination products which are soluble in water or in basic buffered solutions to the extent of approximately 10 percent. These new combination products have been found to exhibit unobvious and valuable physiological properties. For example, while a mixture of gossypol and water is not toxic to goldfish; a dispersion of the gossypol-amino acid combination products when put into water in a concentration of one part to 20,000 parts of water kills the fish in two hours. However, while the gossypol-amino acid combination products are toxic to fish, they are non-toxic to animals. Test rats or mice 50 per cent of which were killed within 48 hours by about 0.005 grams per gram of their weight of pure gossypol were unaffected by over twice that amount of a gossypol-glycine combination product. The non-toxic (to animals) gossypol-amino acid combination products have been found to cause an increase in the blood clotting time of animals such as rabbits. Their physiological properties such as toxicity toward fish and not toward animals is even more surprising in view of the fact that a freshly-prepared gossypol-dextrose combination product which is also toxic toward fish and also increases the blood clotting time of rabbits, is toxic to animals. It is about twice as toxic to rats or mice as is pure gossypol.

While the structure of the gossypol-amino acid combination products has not been established, it is evident from their properties that they differ markedly from the known amine combination products such as dianiline gossypol which are characterized by their water insolubility and physiological inactivity. Similarly, since aqueous solution containing an aqueous extract of a commercially prepared screw-pressed cottonseed meal which had been subjected to the conditions of heat and moisture known to produce what has been referred to as "bound gossypol," exhibited no harmful effects upon fish (when the amount of meal extracted contained an amount of gossypol equivalent to that shown to yield a similar extract which is toxic to fish when the gossypol was present in the form of a gossypol-amino acid combination product); it is evident that the gossypol-amino acid combination products are different substances from such known gossypol complexes.

Substantially any alpha-amino carboxylic acid which is appreciably soluble in an aqueous solution of a pH of about 9 or above can suitably be employed in the production of the gossypol-amino acid combination products. Such acids include glycine, leucine, threonine, serine, lysine aspartic acid, glutamic acid, and the like. A particularly suitable class of alpha-amino carboxylic acids for employment in the production of the present invention are amino-substituted alkanoic acids containing an alpha-amino group which are soluble in an aqueous solution of pH 10 or more. It has been demonstrated that either the neutral or basic members of this class of amino acids produce the combination products having the unique physiological properties mentioned above.

The production of the combination products is conducted in a solvent for both the gossypol and the amino acid. A basic aqueous solution, preferably an alkali metal hydroxide solution, having a pH of at least 10 is a particularly suitable solvent. While gossypol (free or dissolved in a solvent) is known to combine with some solid substances at or above room temperature, such combination products (for example, bound gossypol) exhibit substantially none of the unique and valuable physiological properties of the gossypol-amino acid combination products.

When dissolved in an aqueous alkaline solution containing an amino acid, gossypol reacts rapidly at room temperature, and while temperatures of from 0° C. to the decomposition temperature of the reactants can suitably be used, the reaction is preferably conducted at about normal room temperature. The reaction is rapid enough at room temperature to be productive of good yield when the solution is neutralized with an inorganic acid substantially immediately after dissolving or solubilizing the gossypol. The reaction can also be conducted by dissolving the gossypol and adding the amino acid to the resulting solution.

The combination products can be isolated by removing the solvent after neutralization to a pH of from 7 to 7.2 at any temperature below the decomposition temperature. However, their isolation by the removal of the water by sublimation at 0° C. or below is preferred. They can also be isolated by removing by filtration, centrifugation, extraction, and the like methods, the insoluble materials formed when the pH of the solution is lowered to from about 4.5 to 7. The remaining solvent can then be removed by evaporation, preferably at a temperature of not more than 0° C.

The process of the invention can be conducted in a continuous or batch-wise manner, but the latter mode of operation is preferred.

The proportions of gossypol and amino acid can be varied widely, in general, from about 1:10 to 10:1. We have demonstrated that gossypol combination products exhibiting the above unique properties are formed when gossypol and glycine are combined in ratios of from 9:1 to 1:9 parts.

The products of our invention and the methods for preparing these products are further illustrated but not limited by the following examples.

*Example 1.*—Three grams of glycine was added to 250 ml. distilled water, and three grams of pure gossypol was added to this glycine solution. Aqueous alkali was added while the mixture was being stirred until the gossypol was solubilized, and the pH of the solution was approximately 10.3. Hydrochloric acid solution was added dropwise to bring the pH of the solution to 7.0. The solution was then frozen, and then lyophilized. This material is soluble in water at neutral pH and toxic to goldfish in dilutions of 1 part to 20,000 parts of water.

*Example 2.*—One gram of 1(+) lysine-monohydrochloride was added to 200 ml. of distilled water. While the solution was being stirred, one gram of gossypol and a sufficient quantity of aqueous sodium hydroxide was added to dissolve the gossypol. When complete solution was achieved, hydrochloric acid solution was added until the pH was lowered to 7.0, the solution frozen, and dried by lyophilization. A yellow, brittle residue, weighing 1.87 grams was obtained. This material is soluble in water at neutral pH and toxic to goldfish in dilutions of 1 part to 20,000 parts of water. However, this material was not toxic to mice when given at a dosage level of 12 grams of gossypol-lysine per kilogram body weight of mice. Much smaller doses of gossypol or pigment glands were lethal to the test animals within 24 hours.

*Example 3.*—Twenty-five grams of ammonia-free glycine was dissolved in 600 milliliters of distilled water. Twenty-five grams of pure gossypol was added to this solution. Dilute aqueous sodium hydroxide was added dropwise until the pH of the solution was 11.0. The gossypol was solubilized at this pH. Immediately thereafter, an aqueous solution of concentrated hydrochloric acid was added dropwise until the pH of the solution was reduced to 7.0 to 7.2. During the course of this preparation, the solution was constantly agitated. The solution was then frozen and lyophilized, i. e., the water was removed from the material in a frozen state under conditions of high vacuum, low pressure and low temperature within 48 hours. A yield of 50 grams of fluffy, light yellow product was obtained. The dry product was soluble in water at neutral pH.

This product was not toxic when administered orally to mice or rats, in aqueous media, as large, acute doses. At a dosage level of 12.0 grams of this product per kilogram body weight of the test animals, this product produced no visible effects. On the other hand, pure gossypol had an $ED_{50}$ value (the dose lethal within 48 hours to 50 percent of the test animals) of 4.8 grams ±0.6 gram per kilogram body weight of mice. The $ED_{50}$ value for separated pigment glands was 2.3 grams ±0.11 gram per kilogram body weight. A sample of freshly-prepared water-soluble gossypol-dextrose combination product (described and claimed in our copending application, Serial No. 173,220, filed July 11, 1950) was about as toxic for mice as the pure gossypol, and had an $ED_{50}$ value of 2.6 grams ±0.17 gram per kilogram body weight. The $ED_{50}$ values were calculated according to the method of Miller and Tainter.

Samples of the gossypol-glycine combination product were stored for five months at −18° C. and 28° C. During this storage period, the samples remained non-toxic and water-soluble.

*Example 4.*—Forty-five grams of pure gossypol was added to five grams of glycine dissolved in 500 milliliters of distilled water. Water was added until the volume of the solution was approximately one liter. The pH of the solution was adjusted to 11.0 by the addition of aqueous sodium hydroxide. The gossypol was solubilized at this pH. While the solution was constantly agitated, aqueous hydrochloric acid solution was added dropwise until the pH of the solution was lowered to 7.0 to 7.2. The solution was then frozen and lyophilized. The dried, yellow product was soluble in water at neutral pH.

This product was not toxic when given orally in large, acute dosages to rats. However, 3.0 grams of pure gossypol per kilogram of body weight of the rats, or 0.9 to 1.3 grams of pigment glands per kilogram body weight killed 50 percent of the test animals within 24 hours.

*Example 5.*—Forty-five grams of glycine was dissolved in one liter of distilled water. Five grams of pure gossypol was added to this solution. Then aqueous sodium hydroxide solution was added until the pH of the solution was increased to 11.0. While the solution was being stirred, aqueous hydrochloric acid solution was added until the pH was lowered to 7.0 to 7.2. The solution was then frozen and lyophilized. The dried product was soluble in water at neutral pH, and was not toxic when administered orally in acute, large dosages to rats. Much smaller dosages of pigment glands or gossypol were lethal to the test animals within 24 hours.

The term "amino acid" is employed herein in the usual sense of amino substituted organic carboxylic acids which exhibit the common properties of the amine and the carboxylic acid functions, and does not include polypeptides such as proteins.

Having thus described our invention, what we claim is:

1. A water soluble gossypol-amino acid combination product, prepared by reacting gossypol and an amino acid in an alkaline aqueous medium; and characterized by toxicity to goldfish and non-toxicity to rats or mice, the amino acid being an alpha-amino alkanoic carboxylic acid which is soluble in an aqueous solution of an alkali metal hydroxide having a pH of at least 9.

2. The product of claim 1 where the amino acid is glycine.

3. The product of claim 1 where the amino acid is lysine.

4. A process for the production of a gossypol-amino acid combination product, which process comprises: reacting in an alkaline aqueous media, gossypol and an amino acid; neutralizing the media with an inorganic acid; and removing the water at a temperature of below about 20° C.

5. A process for the production of a gossypol-amino acid combination product, which process comprises: dissolving an amino acid in water; dissolving gossypol in the same solution by raising the pH of the solution to at least 10 by the addition of an alkali metal hydroxide; neutralizing the solution by addition of an inorganic acid; cooling the solution to below 0° C.; and removing the water by sublimation.

6. A process for the production of a gossypol-amino acid combination product, comprising, reaching gossypol and an amino acid in an alkaline aqueous medium.

7. A water soluble gossypol-amino acid combination product, the amino acid being an alpha-amino alkanoic carboxylic acid of the class corresponding in structure to naturally occurring aliphatic amino acids.

8. The product of claim 1 in which the amino acid is a naturally occurring amino acid.

AARON M. ALTSCHUL.
LEAH E. CASTILLON.

REFERENCES CITED

The following references are of record in the file of this patent:

Gallup: J. Biol. Chem. 16, pp. 43–53 (1928).